United States Patent [19]

Nicolas

[11] Patent Number: 4,750,366
[45] Date of Patent: Jun. 14, 1988

[54] METHOD OF AND DEVICE FOR MEASURING AN ULTRASOUND SCATTER FUNCTION

[75] Inventor: Jean-Marie Nicolas, Paris, France

[73] Assignee: U.S. Philips Corporation, New York, N.Y.

[21] Appl. No.: 843,894

[22] Filed: Mar. 25, 1986

[30] Foreign Application Priority Data

Mar. 29, 1985 [FR] France ................................ 85 04820

[51] Int. Cl.$^4$ ...................... G01N 29/00; A61B 10/00
[52] U.S. Cl. ........................................ 73/602; 73/599; 128/660
[58] Field of Search ................................ 128/660–661; 73/597, 599, 602, 620

[56] References Cited

U.S. PATENT DOCUMENTS

| | | | |
|---|---|---|---|
| 4,259,870 | 4/1981 | McLeod et al. | 73/861.25 |
| 4,446,737 | 5/1984 | Hottier | 73/602 |
| 4,512,195 | 4/1985 | Miwa et al. | 128/660 X |
| 4,564,019 | 1/1986 | Miwa | 128/660 |
| 4,594,896 | 6/1986 | Cardoso et al. | 73/599 |
| 4,646,748 | 3/1987 | Fuji et al. | 128/660 |
| 4,688,428 | 8/1987 | Nicolas | 73/602 |

OTHER PUBLICATIONS

Parker, K. J. et al., "Measurement of UTS Attenuation Within Regions Selected from B-Scan Images", IEEE BME Transactions, vol. BME-30, 8-1983.

*Primary Examiner*—Francis J. Jaworski
*Attorney, Agent, or Firm*—Jack E. Haken

[57] ABSTRACT

A biological or other material is scanned along a line or plurality of lines by at least one transducer, and the signals received are separated into n substantially equal, consecutive frequency bands after which the envelope of the signals in each frequency band is determined. Each of the signal envelopes, being proportional to the power spectrum of the echographic signal, is divided by a dividing signal which is proportional to the power spectrum of a phantom which has the same attenuation as the object being examined, the logarithm being determined of the signal resulting from this division, after which the following operations are performed in the channels a, b, . . . , i, . . . n on the basis of the signals thus obtained: (a) calculating the logarithm of a frequency which is representative of the passband of each channel; (b) storing in a memory and/or displaying a function of the ratio of the scatter function of the object scanned and the scatter function of the phantom as a function of the frequency mentioned sub (a); as a representation of the object's scatter function.

5 Claims, 2 Drawing Sheets

METHOD OF AND DEVICE FOR MEASURING AN ULTRASOUND SCATTER FUNCTION

BACKGROUND AND SUMMARY OF THE INVENTION

The invention relates to a method of scanning objects by means of ultrasound echography, involving the repeated transmission of ultrasound signals by means of at least one ultrasound transducer and the reception of the ultrasound echoes which correspond to the principal obstacles encountered by the transmitted signals in their propagation direction, the signals received being separated into n frequency bands which are substantially equal and consecutive so that they span approximately all frequencies of the signals received, the envelope of the signals in each frequency band being subsequently determined.

The invention also relates to a device for performing such a method, including at least one ultrasound transducer which is connected to a transmitter stage for the repeated transmission of ultrasound signals and to a receiver stage for receiving the ultrasound echoes which correspond to the principal obstacles encountered by the transmitted signals in their propagation direction, said receiver stage including at least:

(A) an amplifier which receives the output signal of the transducer;

(B) a group of n channels which are connected in parallel to the output of the amplifier and each of which successively includes:

(1) a bandpass filter, the group of n filters thus formed being such that their respective passbands are substantially equal and consecutive so that they span substantially the passband of the transducer;

(2) an envelope detector which is identical for each channel and which includes a rectifier which is succeeded by a lowpass filter. Such a device can be used, for example for the non-destructive testing of materials and the scanning of biological tissues.

A conventional ultrasound echographic image is obtained by the detection of the envelope of the echoes produced in the tissues by an ultrasound beam. Because the most important echoes arise at the boundaries of the organs, these images mainly show the contours thereof. All information concerning the phase (and hence the frequency) of the signal is then lost. Such information can be related to suitable indicators of some indistinct diseases which are difficult to diagnose by other means.

It is an object of the invention to provide a method of and a device for scanning objects by means of ultrasound echography in which the frequency-dependency of the scatter function of the object scanned can be determined. This method enables a quantitative determination of the scatter function of the object examined which can be characterized by this function so that the pathological condition thereof can be determined.

To this end, the method in accordance with the invention is characterized in that each of the signal envelopes, being proportional to the power spectrum of the echographic signal, is divided by a dividing signal which is proportional to the power spectrum of a phantom having the same attenuation as the object scanned, the logarithm of the signal resulting from this division being determined, after which the following operations are performed in the channels a, b, ..., i, ..., n on the basis of the signals thus obtained;

(a) calculating the logarithm of the central frequency $f_i$ of the passband associated with each channel or of another frequency which is representative of this passband;

(b) storing in a memory and/or displaying a function of the ratio of the scatter function of the object examined and that of the phantom as a function of the frequency mentioned with reference to the calculation performed sub (a) as a representation of the subject's scatter function;

The device for performing the method in accordance with the invention is characterized in that the receiver stage also includes, connected behind the envelope detector; in each channel:

(3) a divider circuit, a first input of which receives the output signal of the corresponding envelope detector and a second input of which receives a dividing signal which originates from a first memory which is controlled by a clock circuit which is activated by the clock of the transmitter stage;

(4) a logarithmic amplifier; the receiver stage also including an arithmetic circuit which is connected to the output of the n channels and which performs the following operations on the basis of the n output signals of the channels:

(a) calculating the logarithm of the central frequency $f_i$ of the passband associated with each channel or of another frequency which is representative of this passband;

(b) storing in a memory and/or displaying a function of the ratio of the scatter function of the object scanned and that of the phantom as a function of the frequency mentioned with reference to the calculation performed sub (a) as a representation of the subject's scatter function.

The invention will be described in detail hereinafter, by way of example, with reference to the accompanying drawings; therein:

DESCRIPTION OF THE PREFERRED EMBODIMENTS

The analysis of the frequency-dependency of the scatter function of the object examined is performed in accordance with the invention by comparison of mean power spectra. It is known that for a time slot w and the instant $\tau$ the formula for a mean power spectrum can be written as:

$$S_w(\tau,f) = |G(f)|^2 \cdot |U(f)|^2 \cdot D(\tau,f) \cdot e^{-2\alpha(f)c} \quad (1)$$

In this equation $|G(f)|^2$ depends only on the transmitted signal and the acoustic and electrical properties of the transducer; $D(\tau, f)$ denotes the filter effect of the diffraction caused by the geometry of the transducer; $\alpha(f)$ and c denote the attenuation and the velocity of the ultrasound waves in the object examined; and $U(F)$ denotes the scatter function of the object.

A first embodiment of the device in accordance with the invention is intended for the analysis of an object, having a known attenuation, by means of data derived by means of a phantom having the same attenuation. In the described example the phantom was formed by a gel containing graphite spheres and having a known back-scatter function (this is because these spheres are Rayleigh scattering bodies when the power spectrum of the scattered wave varies as the fourth power of the frequency). For this phantom the frequency dependency of the scatter function of the object, $U_p(f)$ is known and constant in the frequency range from 1 to 10 MHz. At any point of an echographic line $U(f)$ can be determined for which the following formula holds good:

$$U(f) = \left( \frac{S_w(\tau,f)}{S_{wp}(\tau,f)} \right)^{\frac{1}{2}} \cdot U_p(f) \quad (2)$$

in which $U_P(f)$ and $U(f)$ are the scatter functions of the phantom (known) and the object scanned (not known, to be determined), respectively, and $S_{wp}(\tau,f)$ and $S_w(\tau,f)$ are the formulas for the mean power spectrum for the phantom and the object scanned, respectively.

Figure 1:
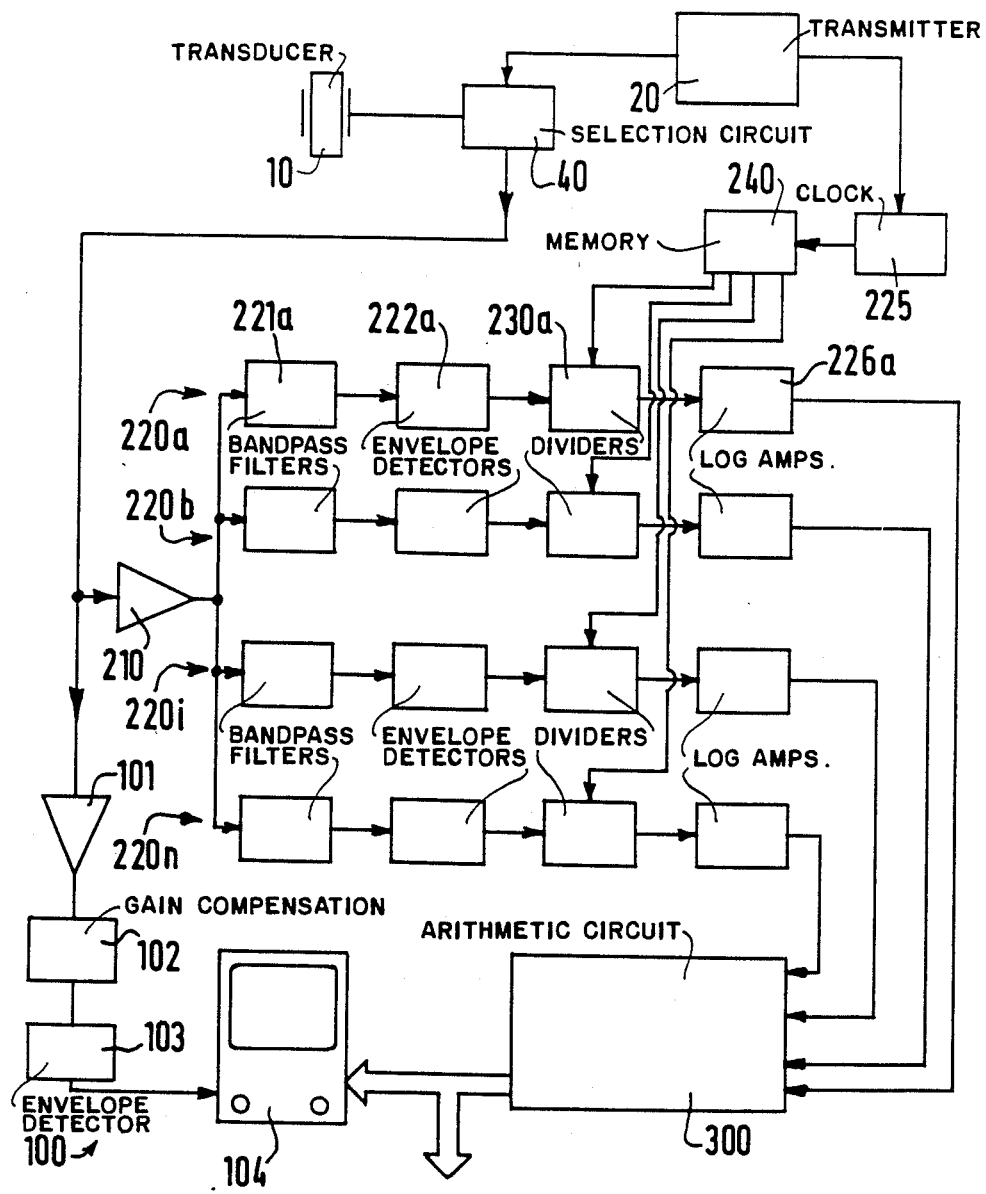
FIG. 1 shows an embodiment of the device in accordance with the invention.

This determination of the scatter function can be realized by means of the device described with reference to FIG. 1. The present device includes a single probe which forms the carrier for an ultrasound transducer 10 and which is suitable for obtaining A-type echograms of objects such as biological tissues. It will be apparent that the invention can be used in exactly the same way when instead of only one line a complete flat slice of the tissues is scanned, either by means of a manually displaceable probe or a probe involving so-called sectorial mechanical angular displacement connected to a radar-type display screen, or by means of a linear array of p ultrasound transducers which define a corresponding number of p parallel scanning directions in the object to be examined, said array being connected to a switching network for successively switching over the echo processing device to each active transducer or groups of transducers, or also by means of an array of transducers with so-called sectorial electronic scanning, said array also being connected to a switching network for switching over the processing circuit and also to a network of delay lines or phase shifters.

The transducer 10 is connected on the one side to a transmitter stage 20 for the repeated transmission of ultrasound signals in an arbitrary scanning direction through the tissues to be examined by means of the transducer, and on the other side to a receiver stage for the processing of the ultrasound echoes which are received by the transducer and which correspond to the principal obstacles encountered by the transmitted signals in their propagation direction. The situation of these obstacles is defined in the echogram by the echoes of high amplitude which denote the boundaries between tissues for which the frequency-dependency of the back-scatter coefficient is to be determined. This association is generally obtained by means of a selection circuit 40 which ensures that either the transmitter stage or the receiver stage is exclusively connected to the transducer (a selection circuit of this kind is mentioned, for example in U.S. Pat. No. 4,139,834). The circuit 40 prevents the transmitted signals from being affected by the signals received and prevents the signals received from being masked by the signals transmitted.

The receiver stage of the described embodiment includes a first processing circuit 100 for processing the ultrasound echoes received, which circuit consists of a first amplifier 101 (actually a preamplifier), a gain compensation device 102, an envelope detector 103 which has a rectifying and a smoothing function, and a display device 104. The output electrode of the transducer 10 is connected to the input of the amplifier 101 whose output signals are applied to the device 102 for compensating for the amplitude of the echoes as a function of the distance, to the device 103, and subsequently to the display device 104 so as to be displayed in the form of an A-type echogram on an axis which corresponds to the principal propagation direction of the transducer 10. The receiver stage also includes a second processing circuit which is connected parallel to the first processing circuit 100 and which itself is composed of the following elements:

(A) a second amplifier 210 which also receives the output signal of the transducer 10;

(B) a group of n channels 220a and 220n which are connected in parallel to the output of the amplifier 210 and each of which successively includes:

(1) a bandpass filter 221a to 221n, the group of filters thus obtained being such that the respective passbands thereof are substantially equal and consecutive so that together they span approximately the passband of the transducer;

(2) an envelope detector 222a to 222n which is identical for each channel and which includes a rectifier and a subsequent lowpass filter having a time constant which is preferably adjustable to a value which is larger than the mean time interval between the echoes of low amplitude which correspond to two adjacently situated scatter points in order to reduce the noise inherent of the biological object and the inhomogeneities thereof.

Figure 2:
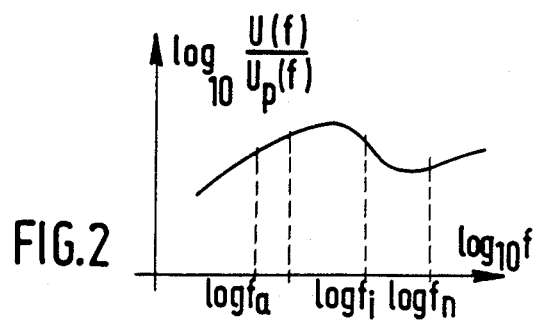
FIG. 2 shows a curve which represents the results of the operations performed by means of the processing circuit included in the device in accordance with the invention.
Figure 3:
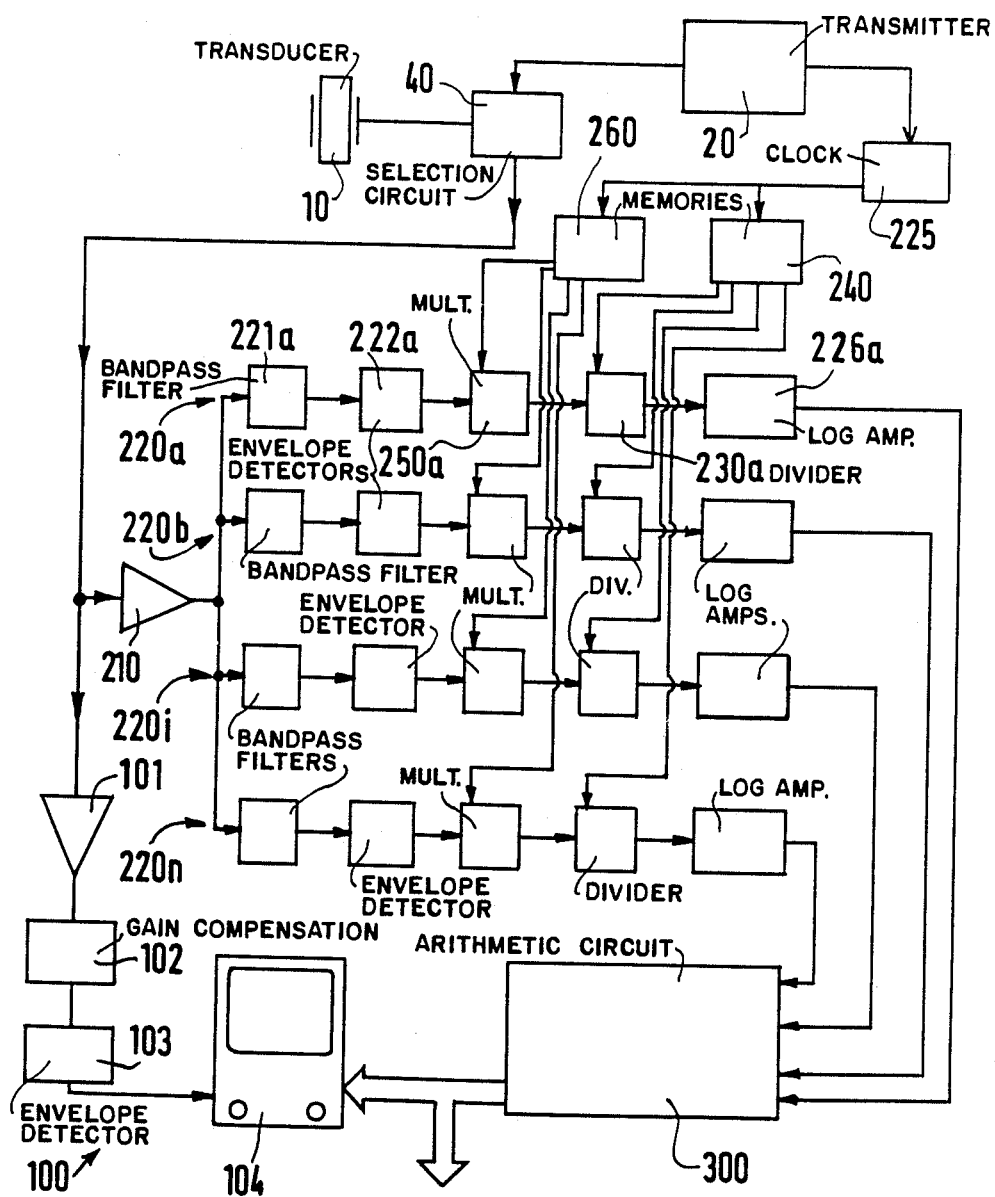

Subsequent to the associated envelope detector, each channel of the receiver stage also includes:

(3) a divider circuit 230a to 230n, a first input of which receives the output signal of the associated envelope detector in order to calculate the expression $(S_w(\tau,f)/S_{wp}(\tau,f))^{\frac{1}{2}}$, a second input thereof receiving a dividing signal from a memory 240 which is controlled by a clock circuit 225 which is activated by the clock of the transmitter stage;

(4) a logarithmic amplifier 226a to 226n;

(C) an arithmetic circuit 300 which is connected to the output of the n channels 220a to 220n and which performs the following operations on the basis of the n output signals of said channels:

(a) calculating the logarithm of the central frequency $f_i$ of the passband associated with each channel (or of another frequency which is representative of this passband);

(b) storing in a memory and/or displaying (in logarithmic coordinates in FIG. 2) the ratio of the scatter function of the object examined and that of the phantom as a function of the frequency mentioned with reference to the calculation performed sub (a);

(c) calculating the scatter function of the object scanned.

By hypothesis this scatter function can be expressed in the polynominal form $U(f) = a\, f^b$. The representation sub (b) is actually a curve which is parallel to the curve $\log_{10}(U(f)/U_p(f))$ (as a function of $\log_{10} f$) and the local slope of this curve is the value $b - b_p$, in which $b_p$ is the value of b in the case of the phantom. Therefore, in the case of the phantom only the value $b_p$ of b need be added to this formula in order to obtain a formula which is proportional to $U(f)$ and hence suitable for determining the frequency-dependency of the scatter function of the object examined.

The expression thus found which is proportional to U(f) represents the desired parameter which is made known to the user either directly by display (on the device 104) or which is stored in the memory for interpretation and later use.

It will be apparent that the invention is not restricted to the described embodiment for which many alternatives are feasible. Particularly, it is to be noted that the memory 240 is either a programmable read-only memory (PROM) or a random access memory (RAM) and that it is loaded as follows, irregardless of whether the transducer is a focussing type or not. A slice of the phantom is selected which is situated at the front of the phantom (with respect to the device) and at a distance Z on the main axis of propagation, the phantom bearing against the transducer. In this position the energy spectrum of the echographic signal is determined by means of a transmitted signal which is assumed to remain the same thereafter; subsequently, this determination is repeated at the same distance Z but for other positions (realized by way of displacements perpendicularly to the main axis of propagation) in order to obtain a mean energy spectrum. For example, a mean spectrum is determined from 100 spectra around the same position. Subsequently, the same determination of the mean energy spectrum is repeated for different distances Z between the device and the phantom. After that, for all successive positions along the axis Z there are calculated the correction values whereby the output signals of the circuits 230a to 230n are subsequently divided; these correction values are written into the memory 240. It is also to be noted that the amplifier 210 of the described embodiment has a fixed gain; should this amplifier be replaced by a type with automatic gain control as a function of the distance, the gain should be temporarily adjusted to a fixed value in order to execute the measurements. Such a result can be obtained by means of a time slot which inhibits the variation of the gain between two instants which correspond to the slice of tissues for which the measurements are performed.

What is claimed is:

1. A method of scanning an object by means of ultrasound echography comprising the steps of:
    (a) repeatedly transmitting ultrasound signals into the object by means of an ultrasound device which comprises at least one ultrasound transducer;
    (b) receiving ultrasound echo signals corresponding to principal obstacles encountered by the transmitted signals in their propagation direction;
    (c) separating the received signals into n substantially equal and consecutive frequency bands which span approximately all frequencies of the received signals;
    performing the following steps (d) through (g) in each of said frequency bands;
    (d) determining an envelope of the signals in the frequency band;
    (e) dividing the signal envelope, which is proportional to a power spectrum of the echographic signal, by a signal which is proportional to the corresponding power spectrum of a phantom which has the same attenuation as the object being scanned;
    (f) calculating the logarithm of the signal obtained from the division of step (e);
    (g) calculating the logarithm of one of a central frequency of the band or another frequency which is representative thereof; and
    (h) storing in a memory and/or displaying a function of the logarithms of the ratio of the power spectra of the object examined and that of the phantom, as determined in step (f) as a function of the logarithms of the frequency, as determined in step (g) as a representation of the object's scatter function.

2. A method as claimed in claim 1, wherein the dividing signal which is proportional to the power spectrum of the phantom is obtained after the following steps have been performed: (a) selecting a slice of the phantom which is situated at the front thereof with respect to an ultrasound device and at a distance Z on a main axis of propagation, the phantom bearing against the transducer; (b) determining, using a constant transmitted signal, the energy spectrum of the echographic signal in this position and subsequently at the same distance Z but for other positions obtained by displacements perpendicularly to the main axis of propagation in order to obtain the mean energy spectrum; (c) repeating the same determination of the mean energy spectrum for other distances Z between the device and the phantom: (d) calculating the value of said dividing signal for all successive positions along the axis Z.

3. The method of claim 1 further comprising the step of calculating a value b which is proportional to the local slope of the functional relationship stored and/or displayed in step (h) where the scatter function U(f) of said object, expressed in polynomial form, is $U(f) = af^b$, a being a proportionality factor and f being the frequency.

4. A device for scanning an object by means of ultrasound echography comprising:
    (a) at least one ultrasound transducer;
    (b) transmitter means connected to said transducer for the repeated transmission of ultrasound signals;
    (c) receiver means connected to said transducer for reception of ultrasound echoes which correspond to the principal obstacles encountered by the transmitted signals in their propagation direction, said receiver means including:
        (A) an amplifier which receives the output signal of the transducer;
        (B) first memory means which store values which are representative of the power spectrum of echoes obtained from a phantom which has the same attenuation as an object;
        (C) a group of channels which are connected in parallel to the output of the amplifier and each of which successively includes:
            (1) a bandpass filter, the group of filters thus formed being such that their respective passbands are substantially equal and consecutive so that they span substantially the passband of the transducer;
            (2) an envelope detector which is identical for each channel and which includes a rectifier which is followed by a lowpass filter;
            (3) divider means having a first input which receives the output signal of the envelope detector and a second input which receives a dividing signal from the first memory means; and
            (4) logarithmic amplifier means which calculate the logarithm of the output of the divider circuit which is representative of the ratio of the power spectra of echoes from the object and from the phantom; and (d) arithmetic means connected to the output of the channels which performs the following equations;
  (1) calculating the logarithm of one of the central frequency of the passband of each channel or of another frequency which is representative thereof; and
  (2) storing in a second memory and/or displaying a function of said logarithm of the ratio of the power spectra of the object scanned and that of a phantom as a function of the logarithms of said frequencies as a representation of the object's scatter function.

5. The device of claim 4 further comprising means for calculating a value b which is proportional to the local slope of the functional relationship stored in the second memory and/or displayed by the arithmetic means where the scatter function $U(f)$ of said object, expressed in polynomial form, is $U(f)=af^b$, a being a proportional factor and f being the frequency.

* * * * *